US005422170A

United States Patent [19]

Iwata et al.

[11] Patent Number: 5,422,170

[45] Date of Patent: Jun. 6, 1995

[54] WOOD BASED PANELS

[75] Inventors: Ritsuo Iwata; Hirotoshi Takahashi; Satoshi Suzuki; Shiro Hanao, all of Hamamatsu, Japan

[73] Assignee: Yamaha Corporation, Shizuoka, Japan

[21] Appl. No.: 40,647

[22] Filed: Mar. 31, 1993

[30] Foreign Application Priority Data

| | | | |
|---|---|---|---|
| Mar. 31, 1992 | [JP] | Japan | 4-077869 |
| May 8, 1992 | [JP] | Japan | 4-116438 |
| Jul. 20, 1992 | [JP] | Japan | 4-192531 |
| Sep. 30, 1992 | [JP] | Japan | 4-262421 |

[51] Int. Cl.$^{6}$ .......................... B27N 5/02; B27N 3/12; B32B 7/02

[52] U.S. Cl. .................................... 428/218; 428/302; 428/464; 428/508; 428/509; 428/516; 428/524; 428/535; 428/920; 428/921

[58] Field of Search ............... 428/464, 508, 509, 516, 428/535, 524, 920, 921, 218, 302

[56] References Cited

U.S. PATENT DOCUMENTS

| | | | |
|---|---|---|---|
| 4,661,398 | 4/1987 | Ellis | 428/921 |
| 4,746,555 | 5/1988 | Luckanuck . | |
| 4,818,595 | 4/1989 | Ellis | 428/921 |

FOREIGN PATENT DOCUMENTS

| | | |
|---|---|---|
| 0514827 | 5/1992 | European Pat. Off. . |
| 2108978 | 9/1982 | United Kingdom . |

*Primary Examiner*—P. C. Sluby
*Attorney, Agent, or Firm*—Ostrolenk, Faber, Gerb & Soffen

[57] ABSTRACT

Wood fiber, inorganic cellular material, flame retardant and an organic binder for binding these materials, are mixed together and hot press formed to give a wood based panel. The resultant panel has a wood like texture, is light weight, has excellent sound absorption properties, and is semi-incombustible, and has a good insulating property for use as a wall or ceiling material.

7 Claims, 2 Drawing Sheets

WOOD BASED PANELS

BACKGROUND OF THE INVENTION

1. Field of the Invention

The present invention relates to wood based panels having a wood like texture suitable for use as ceiling, wall panels and the like, and to their method of manufacture.

2. Background Art

Desirable properties for panel materials used for ceilings, walls and the like are light weight, sound absorbent, incombustible or semi-incombustible, and have good thermal insulating ability, high rigidity, good workability, and a wood like texture.

Up until now, a variety of materials have been sold for use as ceiling and wall linings.

For example, various types of these materials include:

(a) panels consisting mainly of rock wool;

(b) panels made from phenol, aluminum hydroxide, glass fiber and the like;

(c) calcium silicate panels, plaster board panels etc.; and (d) panels consisting mainly of wood such as standard wood board, plywood, particle board, and fiber board.

However, of the types of conventional panel materials mentioned above, the type (a) panels consisting mainly of rock wool, although being inflammable and sound absorbent, have a specific gravity greater than 0.4, do not have a wood like texture, are easily broken when bent, and have poor rigidity and workability. The type (b) panels made from phenol, aluminum hydroxide, glass fiber and the like have a high specific gravity of approximately 0.45, poor sound absorption properties, and high cost. The type (c) calcium silicate boards and plaster boards have a high specific gravity of around 0.7, and reflect sound with minimal sound absorption. The type (d) panels which consist mainly of wood such as standard wood board, plywood, particle board, fiber board and the like utilize wood and hence are rigid and exhibit a wooden texture. However they are combustible, limited in use due to interior finishing restrictions, and the specific gravity is high.

Furthermore, when wood based panels are formed with the wood fibers packed tightly together, thermal conductivity is increased, and acoustic absorptivity drops with a reduction in thermal insulating and sound absorption properties, and the wood like texture of the panel surface is lost.

To obtain good sound absorption and thermal insulating properties, with a wood like textured surface, it is necessary to form the panel with the wood fibers less tightly packed together, at a lower density, so that air voids are suitably dispersed throughout.

Up until now, the production of such wood like panels has involved a wet type method wherein disk-fiberized wood fibers are dispersed in a large amount of water, additives such as binders are then added and the mixture stirred. The material is then spread out in the manner of making paper and hot pressed.

With this method, however, heating and pressing the material in the moist condition results in the wet softened wood fibers being compressed and tightly packed together. At the same time, a physical and chemical change occurs in the constituent elements of the wood fiber, so that the bonding between the fibers is remarkably increased.

Accordingly, with panels formed by the wet method, since the wood fibers are tightly and securely packed together, the panel has high acoustic and thermal conductivity, so that sound absorption and thermal insulating properties are reduced, and a wood like texture is not possible.

SUMMARY OF THE INVENTION

It is an object of the present invention to provide a wood based panel suitable for walls and ceilings, which has a wood like texture, is light weight, and has excellent sound absorption, with semi-inflammable and insulating properties, and also to provide a method of manufacturing such a panel.

The present invention addresses the above problems by mixing together wood fiber obtained by disk-fiberization of wood, inorganic cellular material, flame retardant and an organic binder for binding these materials, and then hot press forming the resultant mixture.

The appropriate proportions of tile materials to be combined for the above-described mixture are, 50 to 400 parts by weight of inorganic cellular material, 5 to 60 parts by weight of flame retardant, and 7 to 150 parts by weight of organic binder, per 100 parts by weight of the wood based panel.

The present invention also relates to improvements using a dry process in the formation of the wood based panel.

Since the wood based panel of the present invention is hot press formed from a mixture of inorganic cellular material, flame retardant, and organic binder added to wood fibers, the material is semi-incombustible, and light weight, has high rigidity, excellent sound absorption and workability, and also exhibits a wood like texture.

Furthermore, since the wood based panel is formed using a dry process which is free of moisture content, there is no swelling of the wood fiber, thereby enabling the shape of the wood panel to be maintained even under heat and pressure. Also, since a physical and chemical change does not occur in the fibrous component, a low density panel can be obtained. Accordingly, compared to conventional panels, improved sound absorption and insulating characteristics are possible, and an excellent wood based panel having a wood textured surface can be obtained.

Moreover, by using the dry method, the beforementioned water removal and drying operations during formation of the panel are not necessary, and the hot press conditions for molding can be set at a lower level, thereby reducing the cost of manufacture.

DETAILED DESCRIPTION OF THE PREFERRED EMBODIMENTS

Figure 1A:
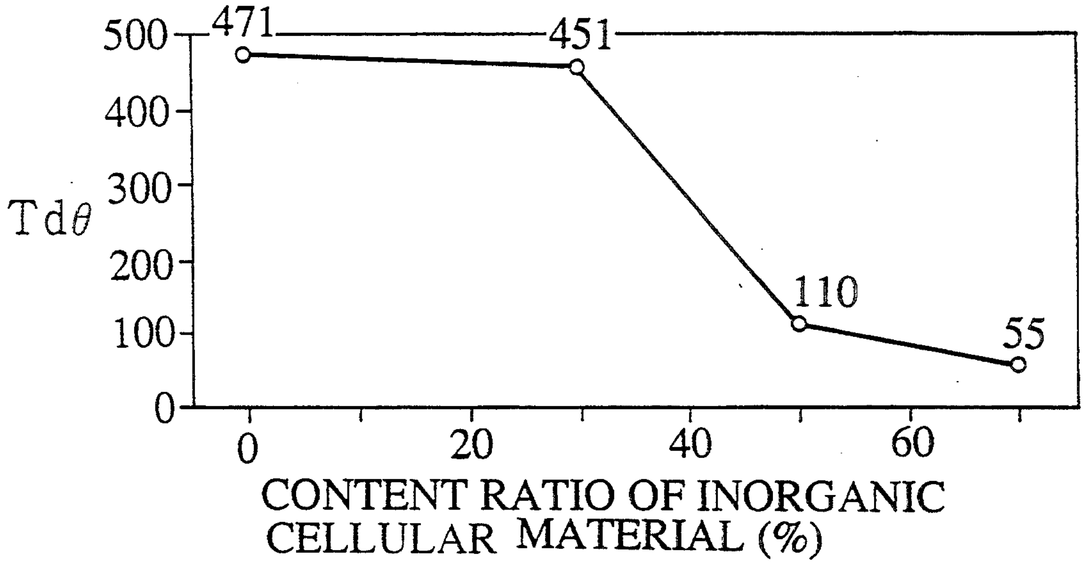
FIG. 1(A) shows a graph of incombustibility of the present invention with respect to Td $\theta$ and a content ratio of inorganic cellular material to mixture of solid materials comprised of inorganic cellular material and wood fiber.

According to the present embodiment, panels are manufactured by mixing together raw wood materials such as wood fiber with inorganic cellular materials or an inorganic filler to provide solid materials; applying binder to the mixture of the solid materials and flame retardant; molding the mixture of the solid materials, binder and Flame retardant; and applying the pressure to the mold with heat treatment.

The present invention is understood as a wood-based panel board including inorganic cellular materials and flame retardant according to its wood-like appearance, while the present invention can also be understood as a panel mainly comprised of an inorganic cellular material further including wood fiber and flame retardant having the composition realizing effective incombustibility in a predetermined composition range.

In the specification, a wet method is defined as a panel manufacturing method performed as follows:

(a) scattering paper waste or sludge of industrial wastes, as a source of wood fiber, in water;

(b) scooping (or collecting) scattered fiber from the water; and (c) depressing and molding the fiber.

The reason for scattering sludge into water is that the sludge is soluble only in water. In the step (a), it can be performed with or without starch. On the contrary, a dry method is defined as a panel manufacturing method without scattering and scooping fiber into or from the water or solution as mentioned above.

Raw materials for the wood fiber used in the wood based panels of the present invention may comprise wood from needle leaf trees such as silver fir, fir, cypress, cedar, spruce, and wood from broad leafed trees such as Japanese beech, Japanese oak, birch, and maple.

Disk-fiberization may be carried out using a disk refiner and the like to fiberize the raw material after It has been digested using high pressure steam. The resultant fibers are then dried, and classified into long fibers of 5 to 30 mm in length and short fibers of less than 5 mm in length. The long and short fibers may then be mixed together in the appropriate amounts, or used in their classified condition.

The wood fiber obtained by disk-fiberization is a dry fiber containing not only cellulose but also residues of lignin and hemicellulose. Due to this composition the resultant panels may be formed with a wood like textured surface.

With the present invention, the cellular material contains many internal cells. These cells may be either interconnected or closed, or a combination of both.

The inorganic cellular material comprises a cellular material made from inorganic materials. For example, these may be materials having an inorganic oxide such as silicon oxide or aluminum oxide as the principle component, with a granular structure filled with minute closed cells. The material should preferably have a density specific gravity of approximately 0.05 to 0.25, a melting point above 1200° C., and good fire resistance, together with a thermal conductivity of 0.036 to 0.05 kcal/m.h.° C. and good insulation and chemical stability. For example, products such as expanded perlite and the like made by the rapid heating of pulverized grains of natural volcanic glass perlite, or pieces of pine resin rock, or products similar to these may be used. Alternatively, granular particles of xonotlite calcium silicate and volcanic ash may be suitable.

There are no particular limitations to the type of flame retardants used in the present invention. For example, these may include phosphate ester type flame retardants such as triphenylphosphate, tricresilphosphate, cresilphenylphosphate, tris (halopropyl) phosphate, tris (haloethyl) phosphate; halogenated organic compounds such as chlorinated paraffin, chlorinated polyethylene, perchloropentacyclodecane, hexabromobenzene, decabromodiphenylethel, tetrabromobisphenol A and its derivatives, hexabromocyclododecane; inorganic flame retardants such as antimony trioxide, antimonate, orthoboric acid barium, zinc boric acid, aluminum hydroxide, ammonium bromide; and reactive type flame retardants such as tetrabromo phthalic anhydride, bromostyrene, and vinylbromide. Of these, the phosphorus compound flame retardants and halogen compound flame retardants are preferable. Furthermore, carbamyl polyphosphate may be used.

Any type of organic binder may be used provided that it is suitable for binding the wood fiber and inorganic cellular material. For example, resins of urethane, urea, phenol, melamine, epoxy, unsaturated polyester, allylic may be used. Of these organic binders, phenol resin is preferable.

In manufacturing the wood based panels of the present invention using the above types of materials, the inorganic cellular material, flame retardant and organic binder are added to the wood fiber and mixed together. The mixture is then preformed, and after hot pressing, the product is trimmed to give the resultant wood based panel.

In this process, a desirable mixture ratio per 100 parts by weight of the wood fiber is, 50 to 400 parts by weight of inorganic cellular material to the wood fiber, 5 to 60 parts by weight of flame retardant to the wood fiber, and 7 to 150 parts by weight of organic binder to the wood fiber.

If the parts by weight of inorganic cellular material is less than 50, the wood based panel is not sufficiently incombustible, and has a high specific gravity and low sound absorption. However, if the parts exceed 400, rigidity is reduced and a wood like appearance is not possible.

If the parts by weight of flame retardant is less than 5, then the Incombustibility is inadequate. However, if the parts exceed 60, rigidity is reduced.

If the parts by weight of organic binder is less than 7, then the rigidity of the panel is inadequate. However, if the parts exceed 150, the specific gravity becomes large and sound absorption is reduced.

More preferably, a ratio of parts by weight of inorganic cellular material is equal or more than 100, to the 100 parts by weight of wood fiber. Furthermore, the ratio of parts by weight of flame retardant is equal or more than 15, to 100 parts by weight of wood fiber. Also, a ratio of parts by weight of organic binder is equal to or more than 5, to 100 parts by weight of inorganic cellular material.

FIG. 1(A) shows a graph of incombustibility of the present invention with respect to Td $\theta$ explained hereunder and a content ratio of inorganic cellular material to a mixture of solid materials comprised of inorganic cellular material and wood fiber. The Td $\theta$ decreases as the content ration of inorganic cellular material increases. FIG. 1(A) shows criticality at the point of 50% of inorganic cellular material. The critical point corresponds to a ratio of 100 parts by weight of inorganic cellular material to 100 parts by weight of wood fiber. Thus, the panel board of the present invention, which comprises 100 or more parts by weight of inorganic cellular material to 100 parts by weight of wood fiber, or 50 or more percentage of inorganic cellular fiber and inorganic material, shows practical incombustibility.

Figure 1B:
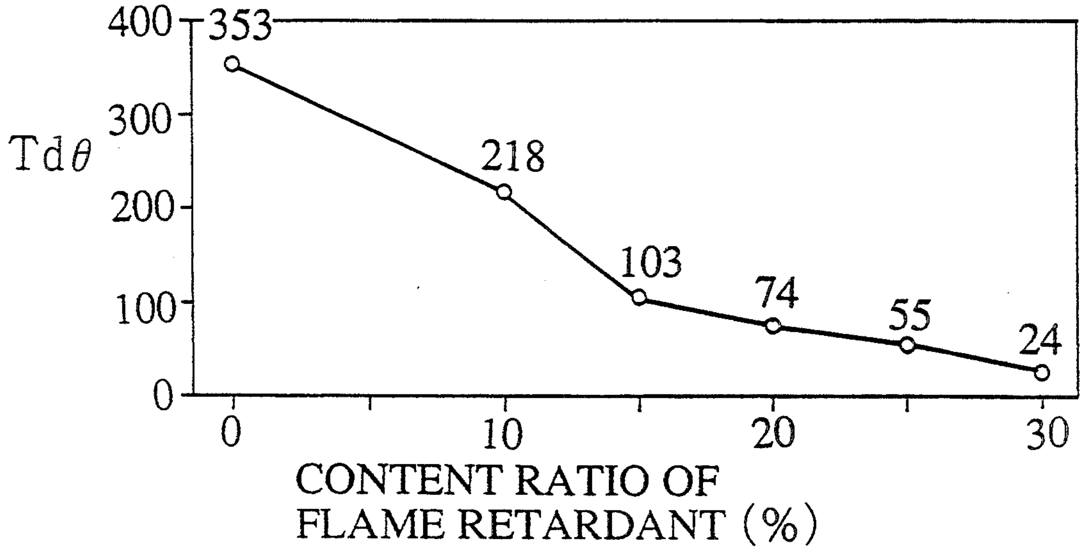
FIG. 1(B) shows a graph of incombustibility of the present invention with respect to Td $\theta$ and a content ratio of flame retardant to wood fiber.

FIG. 1(B) also shows a graph of incombustibility of the present invention with respect to Td $\theta$ and a content ratio of flame retardant to wood fiber. The Td $\theta$ decreases as the content ratio of flame retardant increases. FIG. 1(B) shows criticality at the point of 15% of flame retardant. The critical point corresponds to a ratio of 15 parts by weight of flame retardant to 100 parts by weight of wood fiber. Thus, the panel board of the present invention, which comprises 15 or more parts by weight of flame retardant to 100 parts by weight of wood fiber, shows practical incombustibility.

Figure 1C:
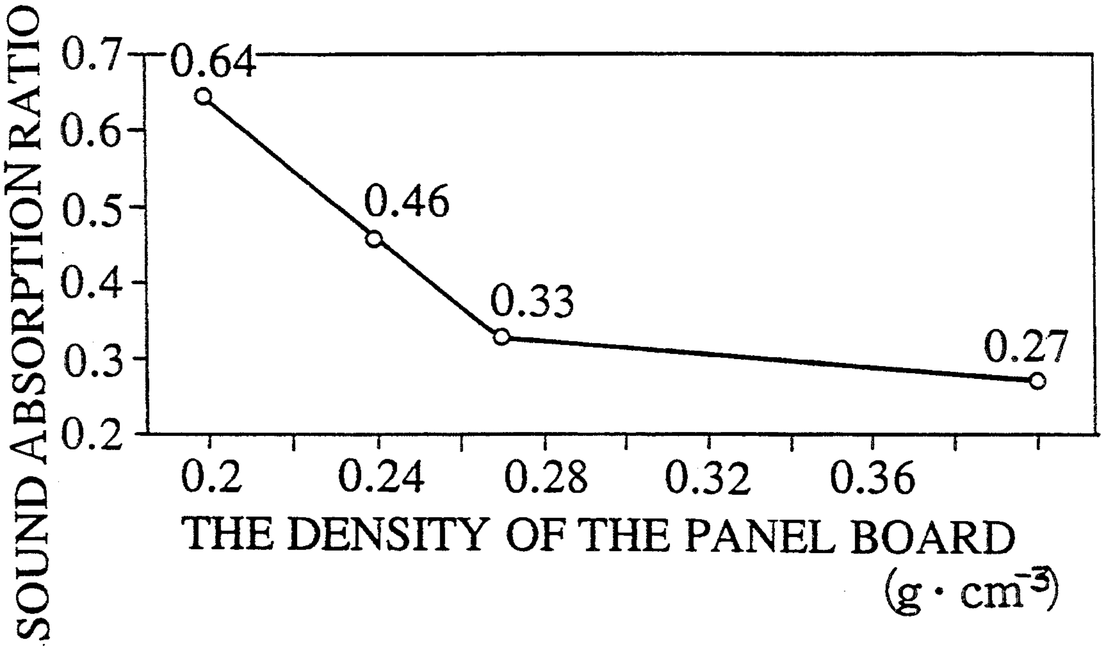
FIG. 1(C) shows a graph of the sound absorption property of the present invention with respect to sound absorption ratio and the density of the panel board.

FIG. 1(C) shows a graph of the sound absorption property of the present invention with respect to the sound absorption ratio and the density of the panel board. The unit of the density is $g \cdot cm^{-3}$. The sound absorption ration decreases as the density becomes larger. FIG. 1(C) shows criticality at the point of 0.27 [$g \cdot cm^{-3}$]. When the density becomes equal or less than 0.27 [$g \cdot cm^{-3}$], the sound absorption ration becomes larger. Thus, the panel board of the present invention, which has 0.27 [$g \cdot cm^{-3}$]or less of density, shows practical sound absorption property.

Figure 1D:
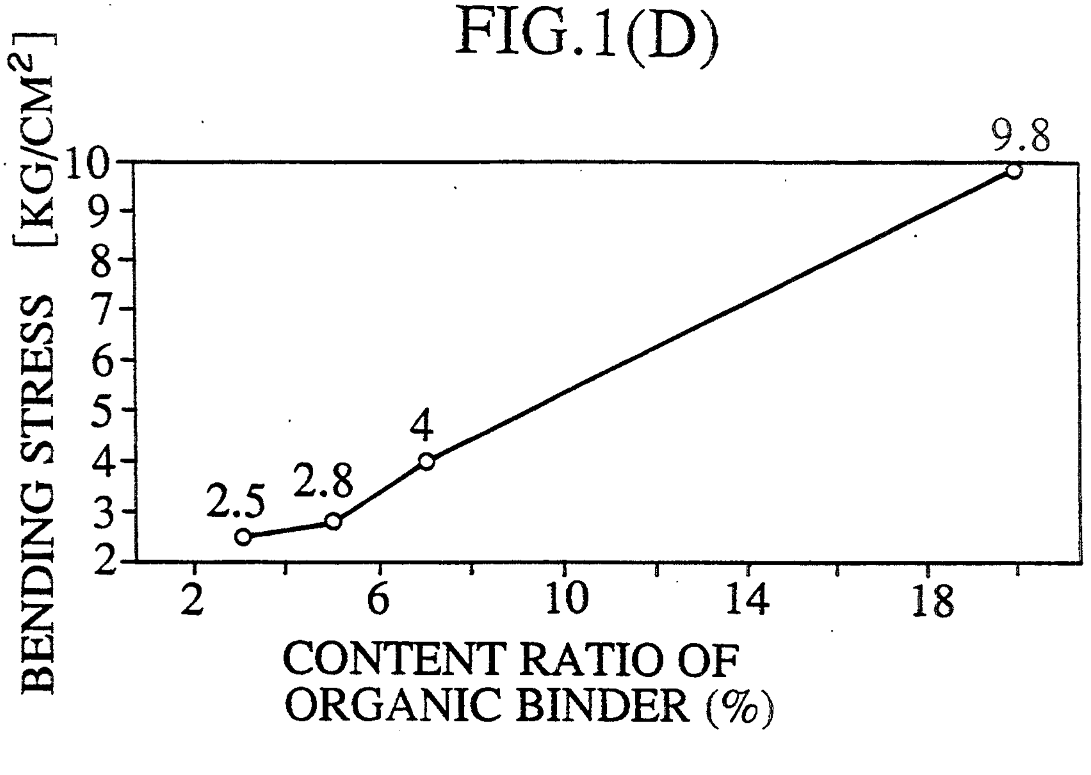
FIG. 1(D) shows a graph of the strength property of the present invention with respect to bending stress and a content ratio of organic binder to a mixture of solid materials comprised of inorganic cellular material and wood fiber.

FIG. 1(D) shows a graph of strength property of the present invention with respect to bending stress and a content ratio of organic binder to the mixture of solid materials comprised of inorganic cellular material and wood fiber. The bending stress becomes larger as the content ratio of organic binder increases. Less than 2% of the organic binder, it is impossible to manufacture a self-sustained panel. The graph shows criticality at the point of 5% of the binder material. The critical point corresponds to a ratio of 10 parts by weight of organic binder to 100 parts by weight of wood fiber. Thus, the panel board of the present invention, which comprises 10 or more parts by weight of organic binder to 100 parts by weight of wood fiber, or 5 or more percentage of binder material to the mixture of solid material comprised of wood fiber and inorganic cellular materials, becomes to have critical strength.

With this type of wood based panel, porosity and a reduction in specific gravity is possible due to the wood fiber, and good sound absorption is achieved. Furthermore, a wood like appearance is possible.

The inner inorganic cellular material contributes to incombustibility, and due to its cellular has a lightening effect reducing the density and improves sound absorption.

Incombustibility of the panel is further improved by the incorporation of the flame retardant.

If fire resistant phenol resin is used as the organic binder, then this contributes to the incombustibility of the panel and enhances the wood like appearance due to its yellow/orange color.

The resultant wood based panel is thus light in weight with a specific gravity of from 0.1 to 0.7. and satisfies semi-incombustibility requirements. Furthermore, it has good sound absorption with a normal incidence acoustic absorptivity of 0.3 to 0.8, and an excellent wood like appearance with good rigidity and workability.

The present Invention also provides the following method of manufacturing wood based panels.

In this method wood fiber obtained by disk-fiberization of raw wood material is mixed together with inorganic filler or inorganic cellular material described hereinbefore in a dry condition.

The raw wood material used in this embodiment is the same described hereinabove.

In this case any material generally used as an inorganic filler may be used. For example, materials such as aluminum hydroxide, calcium carbonate, powdered marble, clay, siliceous earth, silica sand and the like may be used.

The inorganic cellular material comprises a cellular material made from inorganic materials described hereinabove.

Subsequently, organic binder or an aqueous solution thereof is applied evenly over the mixture of wood fiber and inorganic filler. When an aqueous solution binder is used, the mixture is dried after application of the binder.

The flame retardants and organic binder used in this embodiment are the same described hereinabove.

The dry wood fiber and inorganic filler mixture to which the binder has been evenly applied is then spread to an even thickness over the platen of the hot press and hot press formed to give the resultant wood based panel.

The present invention also provides the following method for producing wood based panels having several layers having a surface layer and a core layer.

1. Surface layer

Wood fiber obtained by disk-fiberization of raw material wood Is mixed together with inorganic filler in a dry condition. Subsequently, an organic binder or an aqueous solution thereof is applied evenly over the mixture of wood fiber and inorganic filler. When an aqueous solution binder is used, the mixture is dried after application of the binder.

The dry mixture formed in this way is used as a surface layer material.

2. Core layer

Wood fiber obtained by disk-fiberization of raw wood material is mixed together with inorganic cellular material in a dry condition. Subsequently, organic binder or an aqueous solution thereof is applied evenly over the mixture of wood fiber and inorganic cellular material. When an aqueous solution binder is used, the mixture is dried after application of the binder.

The dry mixture formed in this way is used as a core layer material.

In producing the panel, the surface layer material is first spread evenly to the required thickness on the hot press platen or in a mold, and core layer material is then spread evenly to the desired thickness on top of this. Subsequently, an additional layer of surface layer material is spread evenly to the desired thickness on top of the core layer material. The three layered preformed material comprising surface layer material, core layer material and surface layer material is then hot pressed to give an integrally formed wood based panel.

The present invention, however, is not limited to the above-described method of producing laminated panels with surface layer material provided on both sides of the core, but also covers 2-ply constructions with surface layer material on only one side of the core material, and 3-ply constructions wherein the surface layers on opposite sides of the core layer have different compositions. In all these cases, the above-mentioned dry forming method is applicable without modification.

The method of mixing the wood fiber, inorganic filler and inorganic cellular material is not limited provided that the ingredients can be uniformly mixed together. However equipment such as a mixer which is normally used for mixing fine particles should preferably be used.

Furthermore, a preferred method is to spray the binder or an aqueous solution thereof into the mixture of wood fiber and inorganic filler, or wood fiber and inorganic cellular material while the mixture is being mixed in a mixer, and then heating and drying the mixture. The present invention is not limited to the above-described method wherein the binder is evenly applied to the mixture.

The wood based panel material of the present invention may contain additives such as flame retardants, pigments, preservatives, insecticides, antifungal agents, water repellents, and strengthening agents. These additives may be added at the time of mixing the mixture of wood fiber and inorganic filler, or wood fiber and inorganic cellular material to give a good mixture.

EXAMPLE 1

The following ingredients were mixed In the following proportions:

| | |
|---|---|
| Wood fiber | 100 parts by weight |
| Inorganic cellular material (Mitsui Perlite: Mitsui Mining and Smelting Co. Ltd.) | 100 parts by weight |
| Organic binder (Crude Methylene Diphenyl Diisocyanate/Phenol resin) ("Phenol OTE111" made by Showa High Polymer Co. Ltd.) in the ratio of ½ by weight) | 20 parts by weight |
| Flame retardant (Phosphorus, nitrogen type compound) | 40 parts by weight |

The mixture was then hot pressed at 140° C. and 15 kg/cm$^2$ for 15 mains, to produce a 15 mm thick panel 300 mm wide and 300 mm long.

Acoustic absorptivity measurements and incombustibility tests for this panel were then carried out.

The acoustic absorptivity was determined according to JIS-A-1405 "Method of test for Sound Absorption of Acoustical Material by the Tube Method".

Incombustibility tests were carried out according to JIS-A-1321 "Testing Method for Incombustibility of Internal Finish Material and Procedure of Buildings".

In JIS-A-1321, test parameter Tc, Td θ and CA are defined as follows. Before the Tc, Td θ and CA are defined, technical terms are defined as follows:

The exhaust temperature curve is defined as a curve which an electronic-tube-type-recording-thermometer defined in the JIS-A -1321 2.3.2 represents.

The standard temperature curve is defined as a curve which is obtained by connecting points obtained by adding 50° C. to the exhaust temperature points, defined in JIS-A-1321 3.2.1. (4), measured at each of the defined lapsed times after an adjustment of heat treatment.

(a)Tc

Tc Is defined as a time which the exhaust temperature curve exceeds the standard temperature curve.

(b)Td θ

Td θ is defined as an enclosed area between the exhaust temperature curve and the standard temperature curve from the time when the exhaust temperature curve exceeds the standard temperature curve up to the test end time, i.e., 10-minute.

(c)CA

CA is defined as a smoke coefficient per unit area which is obtained by the calculation hereunder:

$$CA=240\log_{10}I_0/I$$

In this equation, $I_0$: the light intensity at the beginning of the heat treatment test (in the unit of 1×), and I: the least light intensity during the heat treatment test (in the unit of 1×).

The results for the test panel with a specific gravity of 0.2 gave an acoustic absorptivity of 0.45. The semi-incombustible surface test results gave a pass with Tc=6.7 mains. Td θ=14, CA=14, after-flame=0, with zero penetration. The panel also had a high rigidity and strength of 30 to 40 kg/cm$^2$, and a wood like appearance.

The passing requirements for the semi-incombustible surface tests are Tc Is greater than 3.0 mins, Td θ is less than 100, CA is less than 60, the after-flame is below 30 and zero penetration.

EXAMPLE 2

This example had the same ingredients as for example 1 except that 15 parts by weight of organic binder and 20 parts by weight of flame retardant were used. Semi-incombustible surface material tests were carried out.

The results were as follows. The material passed the test with Tc=4.7 mains, Td θ=58, CA=10, after flame=0, and zero penetration. The other results obtained were the same as in example 1.

COMPARATIVE EXAMPLE 1

This example had the same ingredients as In example 1 except that polyole urethane was used as a binder, and a flame retardant was not used. Semi incombustible surface material tests were carried out.

This material failed the tests with Tc=0.5 mains and Td θ=519. Other test items passed the test. The acoustic absorptivity of this material was 0.60.

EXAMPLE 3

The panel was produced by the following steps:

(1) The following materials were mixed in an 80 cm diameter by 70 cm deep rotary type mixing drum (subsequently referred to as a drum) having a cover with a 35 mm diameter hole in the center:

| | |
|---|---|
| Disk-fiberized wood fiber | 420 g |
| Aluminum hydroxide (Nippon Light Metal Co. Ltd., B-53) | 180 g |
| Powdered Phosphorus compound flame retardant (Marubishi Oil Chemical Co. Ltd.) | 84 g |

(2) A binder was produced by beating together the following materials at approximately 7000 rpm.

| | |
|---|---|
| Phenol resin (Showa High Polymer Co. Ltd. OTE-113A) | 18 g |
| Polyisocyanate resin (Sumitomo Bayer Urethane Co. Ltd., crude-MDI (Methylene Diphenyl Diisocyanate)) | 72 g |
| Water | 72 g |

In this step, water is added to the resin material for controlling viscosity of the resin material. In this step water is not for scattering fiber. This point distinguishes the dry method from the wet method.

(3) The binder from step 2 was transferred to an air spray can having a 1 mm diameter orifice. Then, while the drum containing the raw materials from step 1 was rotated at approximately 30 rpm, the binder was spayed from the can at a pressure of 3 $kg/cm^2$ into the central hole of the cover to evenly apply the binder to the raw materials. After application of the binder, the materials were dried for approximately 15 mains using a 50° C. hot air circulatory type drier. The resultant material was for use as surface layer material.

(4) The inorganic cellular material was prepared as follows:

480 grams of granular perlite (grain size 0.1 to 2.5 mm, Mitsui Mining and Smelting Co. Ltd., Mitsui Perlite B) was placed in the drum, and 24 grams of aqueous solution additive for the perlite was sprayed onto the perlite in the drum. The mixture was then removed from the drum and dried for approximately 4 hours using tile 50° C. hot air circulation type drier.

In a similar fashion, 24 grams of additive aqueous solution was sprayed onto 480 grams of granular perlite (grain size 0.1 to 1.2 mm, Mitsui Mining and Smelting Co. Ltd., Mitsui Perlite process No. 4), and the mixture then dried. The resultant two types of perlite were then mixed together to give the inorganic cellular material.

(5) The following materials were mixed in an 80 cm diameter by 70 cm deep rotary type mixing drum (subsequently referred to as a drum) having a cover with a 35 mm diameter hole in the center:

| | |
|---|---|
| Disk-fiberized wood fiber | 240 g |
| Inorganic cellular material | 960 g |
| Powdered Phosphorus compound flame retardant (Marubishi Oil Chemical Co. Ltd.) | 48 g |

(6) A binder was produced by beating together the following materials at approximately 7000 rpm.

| | |
|---|---|
| Phenol resin (Showa High Polymer Co. Ltd. OTE-113A) | 36 g |
| Polyisocyanate resin (Sumitomo Bayer Urethane Co. Ltd., crude-MDI) | 144 g |
| Water | 144 g |

(7) The binder from step 6 was transferred to an air spray can having a 1 mm diameter orifice. Then, while the drum containing the raw materials from step 5 was rotated at approximately 30 rpm, the binder was sprayed from the can at a pressure of 3 $kg/cm^2$ into the central hole of the cover to evenly apply the binder to the raw materials. After application of the binder the materials were dried for approximately 15 mains using a 50 ° C. hot air circulatory type drier. The resultant material was for use as core layer material.

(8) Half of the surface layer material was spread out evenly in a 1 m by 1 m box mold of the type used for making paper. The core layer material was then spread evenly to cover this layer.

Subsequently, the remaining portion of the surface layer material was spread over the core layer material and the lid lowered to give a provisional squeezing.

(9) The three layered laminate material was then removed from the box mold and introduced into a press.

(10) With a 9 mm spacer inserted between the platens of the press, the material was pressed for approximately 10 mains at a pressure of 3 to 5 $kg/cm^2$ with the platens heated to approximately 150° C. to produce a three ply laminated wood based panel.

The resultant three ply wood based panel had a surface layer thickness of 1.5 mm and a core layer thickness of 6 mm.

The ratio of inorganic filler to wood fiber for the wood based panel of example (3) was calculated as follows:

$$\frac{180 + 960}{420 + 240} \times 100 = 172.7\%$$

Acoustic absorptivity measurements, incombustibility tests and thermal conductivity measurements for this panel were then carried out.

The acoustic absorptivity was determined according to JIS-A-1405 "Method of test for Sound Absorption of Acoustical Material by the Tube Method".

Incombustibility tests were carried out according to JIS-A-1321 "Testing Method for Incombustibility of Internal Finish Material and Procedure of Buildings".

Thermal conductivity was measured by the method of JIS-A-1412 "Testing Method for Thermal Transmission Properties of Thermal Insulation".

Results for a panel with a specific gravity of 0.23 gave an acoustic absorptivity of 0.6, and a thermal conductivity of 0.058 kcal/m·h·°C. The semi-incombustible surface test results gave a pass with $Tc=5.5$ mains, Td $\theta=14$, $CA=18$, after flame=0, with zero penetration. The panel also had a high rigidity and strength of 15 $kg/cm^2$, and a wood like appearance.

COMPARATIVE EXAMPLE 2

The panel had the same composition as example 3 except that it was formed by the conventional wee method. The specific gravity was high (above 0.6), acoustic absorptivity was 0.2 and thermal conductivity was 0.10 kcal/m·h·°C.

The results show that panels produced by the dry method have improved sound absorption and insulative properties.

The invention may be embodied in other specific forms without departing from the spirit or essential characteristics thereof.

The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A wood based panel comprising:

dry wood fiber;

inorganic cellular material;

a flame retardant; and an organic binder for binding the dry wood fiber, the inorganic cellular material and the flame retardant;

wherein the mixture proportions per 100 parts by weight of said wood fiber are at least 50 parts by weight of said inorganic cellular material and at least 15 parts by weight of said flame retardant, with an overall density which does not exceed 0.3 $g/cm^3$.

2. The wood based panel of claim 1, wherein the mixture proportions per 100 parts by weight of wood fiber are, 50 to 400 parts by weight of inorganic cellular material, 15 to 60 pares by weight of flame retardant, and 7 to 150 pares by weight of organic binder for binding these materials.

3. The wood based panel of claim 1, wherein the melting point of the inorganic cellular material is greater than 1200° C.

4. The wood based panel of claim 3, wherein the thermal conductivity of the inorganic cellular material is within the range from 0.036 to 0.05 kcal/m·h·°C.

5. The wood based panel of claim 1, wherein the organic binder is a phenol resin.

6. A wood based panel according to claim 1, wherein the percentage by weight of inorganic cellular material is greater than the combined percentages by weight of the wood fiber, the flame retardant and the organic binder.

7. A wood based panel according to claim 1, wherein the sound absorption ratio is greater than 0.3.

* * * * *